E. D. Murfey,
Journal.
No. 108,080. Patented Oct. 4, 1870.
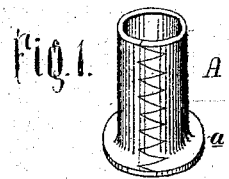 
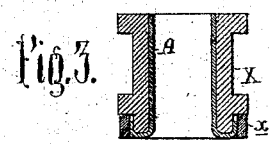 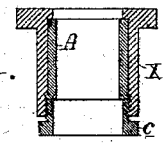
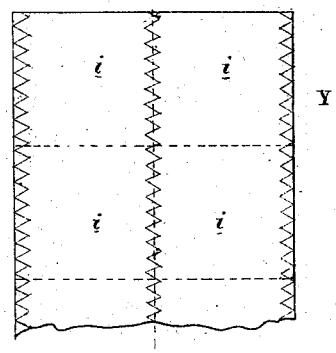
Witnesses.
Albert B. Norris
B. Severson
E. D. Murfey
By her attorneys
Housm & Son

United States Patent Office.

ELIZA DEXTER MURFEY, OF NEW YORK, N. Y., ASSIGNOR TO MANHATTAN PACKING MANUFACTURING COMPANY.

Letters Patent No. 108,080, dated October 4, 1870.

IMPROVEMENT IN JOURNAL-BEARINGS.

The Schedule referred to in these Letters Patent and making part of the same.

I, ELIZA DEXTER MURFEY, of New York, county of New York, State of New York, have invented an improved Journal-Bearing, of which the following is a specification.

Nature and Object of the Invention.

My invention consists of a hollow cylinder or tube prepared from the material patented to me on the 12th of July, 1870, or its equivalent, as fully described hereafter, and forming a cheap, durable, and effective substitute for metallic bearings for the journals of spindles and shafts.

Description of the Accompanying Drawing.

Figures 1 and 2 are perspective views, showing different forms of my improved bearing;

Figures 3 and 4, sectional views, showing the said bearings applied to journal-boxes; and Figure 5, a view showing the manner in which the bearings can be made.

General Description.

The bearing A consists of a hollow cylinder or tube, open at both ends, and on one end of which may be an external flange, $a$, the cylindrical portion of the bearing being adapted to a journal-box, and to the journal of a spindle or shaft, and the flange, when the bearing is provided with the latter, serving as a means by which the bearing may be prevented from being displaced or turning in the box, the flange being clamped between the box X and a ring, $x$, fig. 3, secured by screws or otherwise.

When the bearing is of sufficient thickness, the flange may be dispensed with, and it may be secured in the box by a follower, $c$, as shown in fig. 4.

The bearing may be made from sheets Y of the material patented to me on the 12th day of July, 1870, or of equivalent material.

These sheets Y are cut to form oblong pieces or strips, $i$, fig. 5, with serrations at the opposite edges, of such a shape and so arranged that, when a strip is bent to a tubular form, the projections at one edge will fit the recesses at the other.

After a strip has been bent to a tubular form, the adjoining ends may be permanently connected in any suitable manner; but the best mode, when the strip is impregnated with an adhesive material, is to partly dissolve the latter, by heat or otherwise, and allow it to harden, and cement together the edges which are in contact with each other.

It is not absolutely necessary to cement the ends of the strips permanently together, as the tubular form may be maintained by bending the strip and inserting it in a tube or in the box, with its ends merely in contact.

After the strip has been formed into a tube, one end of the latter may be expanded in any suitable manner, to form the flange $a$.

In place of the fabric referred to, felt, or bibulous paper, tubular knitted or woven fabric, or any suitable non-metallic material or composition, which can be molded or formed of the desired shape, and which will absorb or hold a lubricant or lubricating composition, may be used in making the tubular bearing, and the said lubricant or lubricating composition may be applied either to the bearing after it is made, or to the material from which the bearing is to be manufactured.

By making the said bearing from sheets serrated at the edges, the seam formed by joining the ends is irregular, and a more continuous bearing-surface is presented than if the seam was straight.

The above-described non-conducting bearing is much cheaper than the metal bearings, which must be accurately bored and polished. It may be made in whole or in part of composition which renders the application of oil to the journal unnecessary, while the journal is less liable to become heated than when turning in contact with a metallic surface.

I claim, as a new manufacture—

1. A bearing for journals, consisting of the material herein described formed into a tube, adapted to a journal and journal-box, as set forth.

2. The said bearing of flexible material, having at one end a flange, $a$, for the purpose set forth.

In testimony whereof I have signed my name to this specification in the presence of two subscribing witnesses.

E. D. MURFEY.

Witnesses:
ALBERT H. NORRIS,
CHARLES E. FOSTER.